(No Model.)

H. VAN HOEVENBERGH.
COMPOUND ELECTRIC CABLE.

No. 292,772.  Patented Jan. 29, 1884.

Witnesses.
C. L. Parker
R. H. Whittlesey

Inventor. Henry Van Hoevenbergh
By Attorney. George H. Christy

UNITED STATES PATENT OFFICE.

HENRY VAN HOEVENBERGH, OF ELIZABETH, NEW JERSEY, ASSIGNOR TO RICHARD S. WARING, OF PITTSBURG, PENNSYLVANIA.

COMPOUND ELECTRIC CABLE.

SPECIFICATION forming part of Letters Patent No. 292,772, dated January 29, 1884.

Application filed February 21, 1883. (No model.)

*To all whom it may concern:*

Be it known that I, HENRY VAN HOEVENBERGH, a citizen of the United States, residing at Elizabeth, county of Union, State of New Jersey, have invented or discovered a new and useful Improvement in Compound Electric Cables; and I do hereby declare the following to be a full, clear, concise, and exact description thereof, reference being had to the accompanying drawings, making a part of this specification, in which—like letters indicating like parts—

Figure 1:
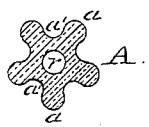
Figure 2:
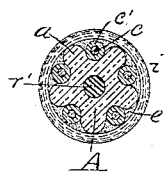
Figure 3:
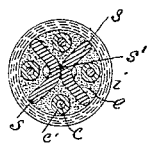

Figure 1 is a sectional view of the metal core of my improved cable. Fig. 2 is a sectional view of the cable complete; and Fig. 3 is a similar view, illustrative of modifications in form and construction as hereinafter described.

My invention relates to certain improvements in compound electric cables; and, in general terms, it consists of a central core or body of metal, formed with longitudinal plates, fins, or blades, radiating from its axial center, with intermediate grooves or channels, within which are insulated conducting-wires, the whole being covered by a protecting wrapping or case, as hereinafter more fully described and claimed.

The purpose of my invention is to provide a compound electric cable, adapted for use either as an air-line, or under ground, or in water, which shall be highly flexible, easily handled, economically constructed, and free from disturbance by induction.

I have illustrated the form and construction of my improved cable in the drawings, in which A represents a central core of metal, formed with radially-divergent plates, fins, or blades $a$, extending longitudinally, with intermediate grooves or channels, $a'$. If the cable is designed for laying in a trench or on other continuous bed, this body or core A may be formed of lead or other soft ductile metal or alloy, adapted to be drawn or pressed to the desired radiating form, as in Figs. 1 and 2; or, if greater tensile strength is desired, the body or core may be formed of iron or steel, rolled or drawn—as pinion-wire is drawn, for example—to the described form; but if a suspended air-line is desired, I prefer to employ wrought sheet or rolled metal, iron, steel, or copper plates $s$, Fig. 3, bent and joined along the angles $s'$ by seaming, riveting, or soldering, in order to secure lightness with great tensile strength.

Within the channels $a'$ are laid electric conducting-wires $c$, which are covered or coated with any suitable insulating material, $c'$, as rubber, gum, or cotton, saturated with paraffine or other known or suitable substance, and the remaining space between the radial plates $a$ is filled with any convenient substance, $e$, either a good or bad conductor of electricity, preferably a non-conductor, adapted to exclude moisture, and also to yield under pressure imposed upon it or on the wires in bending, twisting, or otherwise handling the cable rubber, gum, pitch, asphaltum, or other equivalent hydrocarbon compound or yielding packing may be employed for this purpose. The circular body thus formed, consisting of metallic core, insulated conductors, and yielding packing, is then covered with a pipe-like case of lead, $i$, or, as an equivalent, it may be wrapped any desired number of times with water-proof cloth, paper, sheet metal, wire, or other suitable material adapted to hold the parts of the cable together and afford the desired protection from the action of outside agencies. Various kinds of wrappings adapted for this purpose are commonly employed in covering cables, and they may be selected with reference somewhat to the intended use of the cable—for example, if it is to be suspended by attachment at intervals to supports, I prefer to employ a light exterior wrapping of paper, cloth, or equivalent material, suitably prepared as commonly practiced in the art, or, if it be laid in a continuous bed, as in a trench, a metal covering of lead, wire, or sheet metal may be employed to advantage. If the core A be made of lead or equivalent soft ductile metal or alloy, a central or axial passage, $r$, (see Fig. 1,) may be made therein in the operation of forming the core, which passage may inclose either an insulated conducting-wire, $r'$, or a naked strengthening-wire, designed to afford additional strength to the cable by sustaining tensile strain thereon.

The purpose or function of the metal core A is in part to space or separate the wires, but more especially to prevent the evil effects of induction in the cable by surrounding the wires in their inner or adjacent sides by intervening plates of metal, which receive or intercept the radial rays of force excited by electric action in companion wires, or by making and breaking circuit in such wires, thereby shielding or protecting one wire from induction excited by use of an adjoining wire. To secure such results it is requisite that the wires be separated in the direction of the lines of force between wires by a body of metal of considerable thickness compared with the size of the conductors. Thin wrappings of metal foil about the wires will not secure these results to the desired extent.

Another advantage resulting from my improved form of cable is the provision made in its construction for bending without compression of and consequent injury to the wires. This is due in a measure to the space in the several channels filled with packing $e$, which will yield to some extent, and thus relieve pressure which might otherwise be imposed upon the wire coatings by bending the cable. Such freedom of bending without injury to the wires is in the practical handling of the cable an important consideration. In cables of this class it is customary to make use of copper wires for electric conductors. If moisture (water in any form) finds access to or comes in contact with the insulating material surrounding the wires, especially when a core or body of lead is employed, electrical action is liable to take place, all the elements being present requisite to form a battery in the cable itself, either primary as a generator or secondary as a storage battery. Phenomena of this character have been observed in cables some time in use containing lead and copper, caused apparently by the presence of moisture in the cable. It is therefore highly important, in constructing a cable having such dissimilar metallic elements, that careful provision be made to exclude moisture from the insulating material, which I have done in my improved cable by the wrapping or exterior case, $i$, and this I consider an important element of my invention.

I am aware that it is not new with me to form a cable having a longitudinally-grooved metal core or body for separating insulated conductors laid and packed in the grooves or depressions of the core without an exterior wrapping or cover, and I make no claim herein to a cable having such elements of construction alone.

I claim herein as my invention—

1. A compound electric cable having, in combination, a central core or body, A, formed of radially-divergent metal plates or blades $a$, with intermediate channels, $a'$, insulated conducting-wire $c$ within such channels, a yielding packing, $e$, filling the channels around the wires, and an exterior wrapping or case, $i$, substantially as and for the purposes set forth.

2. In a compound electric cable, the central body or core, A, of metal, having an axial passage, $r$, radially-divergent plates or blades $a$, and intermediate channels, $a'$, in combination with core-wire $r'$, insulated conductors $c$ in the channels $a'$, packing $e$, and exterior case or wrapping, $i$, substantially as and for the purposes set forth.

In testimony whereof I have hereunto set my hand.

HENRY VAN HOEVENBERGH.

Witnesses:
C. S. PARKER,
R. H. WHITTLESEY.